(12) United States Patent
Roy et al.

(10) Patent No.: US 6,321,331 B1
(45) Date of Patent: Nov. 20, 2001

(54) REAL TIME DEBUGGER INTERFACE FOR EMBEDDED SYSTEMS

(75) Inventors: Subhash C. Roy, Stamford; Paul Hembrook, New Milford; Eugene L. Parrella, Monroe; Richard Mariano, Bethel, all of CT (US)

(73) Assignee: Transwitch Corporation, Shelton, CT (US)

( * ) Notice: Subject to any disclaimer, the term of this patent is extended or adjusted under 35 U.S.C. 154(b) by 0 days.

(21) Appl. No.: 09/064,474

(22) Filed: Apr. 22, 1998

(51) Int. Cl.⁷ .................................................. G06F 9/30
(52) U.S. Cl. .............................................. 712/244
(58) Field of Search ................................. 712/227, 228, 712/229, 230, 231, 244; 714/23–48, 15, 16, 38, 25; 717/4

(56) References Cited

U.S. PATENT DOCUMENTS

| | | | |
|---|---|---|---|
| 5,428,618 | * | 6/1995 | Ueki ...................................... 395/709 |
| 5,440,700 | * | 8/1995 | Kaneko ................................. 712/227 |
| 5,473,754 | * | 12/1995 | Folwell .................................. 714/45 |
| 5,491,793 | | 2/1996 | Somasundaram ....................... 714/45 |
| 5,513,346 | | 4/1996 | Satagopan et al. ..................... 714/48 |
| 5,544,311 | * | 8/1996 | Harenberg .............................. 714/40 |
| 5,572,672 | * | 11/1996 | Dewitt .................................... 714/47 |
| 5,640,542 | | 6/1997 | Whitsel ........................... 395/500.49 |
| 5,724,505 | * | 3/1998 | Argade ................................... 714/45 |
| 6,052,774 | * | 4/2000 | Segars .................................... 712/200 |

OTHER PUBLICATIONS

Meriam–Webster, "Meriam–Websters's Collegiate Dictionary, Tenth Ed.", pp. 244–245, and 328, 1997.*

* cited by examiner

Primary Examiner—John F. Niebling
Assistant Examiner—Stacy Whitmore
(74) Attorney, Agent, or Firm—David P Gordon; David S Jacobson; Thomas A Gallagher

(57) ABSTRACT

A debugging interface includes a pair of decoders and an event history buffer coupled to the sequencer of a processor. The first decoder is coupled to the program counter of the sequencer and the Instruction RAM of the processor. The second decoder is coupled to the cause register of the sequencer and the event history buffer is also coupled to the cause register. The first decoder provides a three bit real time output which is indicative of the processor activity on a cycle by cycle basis. The three bit output indicates seven different conditions: whether the last instruction executed by the processor was an inc, an exception, an exception with no event history buffer entry, or a branch taken, whether there has been no instruction executed since the last clock cycle, and whether a jump was an immediate jump or a jump to a register. The event history buffer is loaded with more detailed information about the instruction last executed when the first decoder indicates that the last instruction was an exception or a jump to a register, and when there is a change in state of an interrupt line or an internal processor exception. An exemplary implementation of the debugging interface is embodied on an ASIC chip having three processors. Each processor is provided with a first and second decoders and a single event history buffer for all processors is provided on the chip.

22 Claims, 3 Drawing Sheets

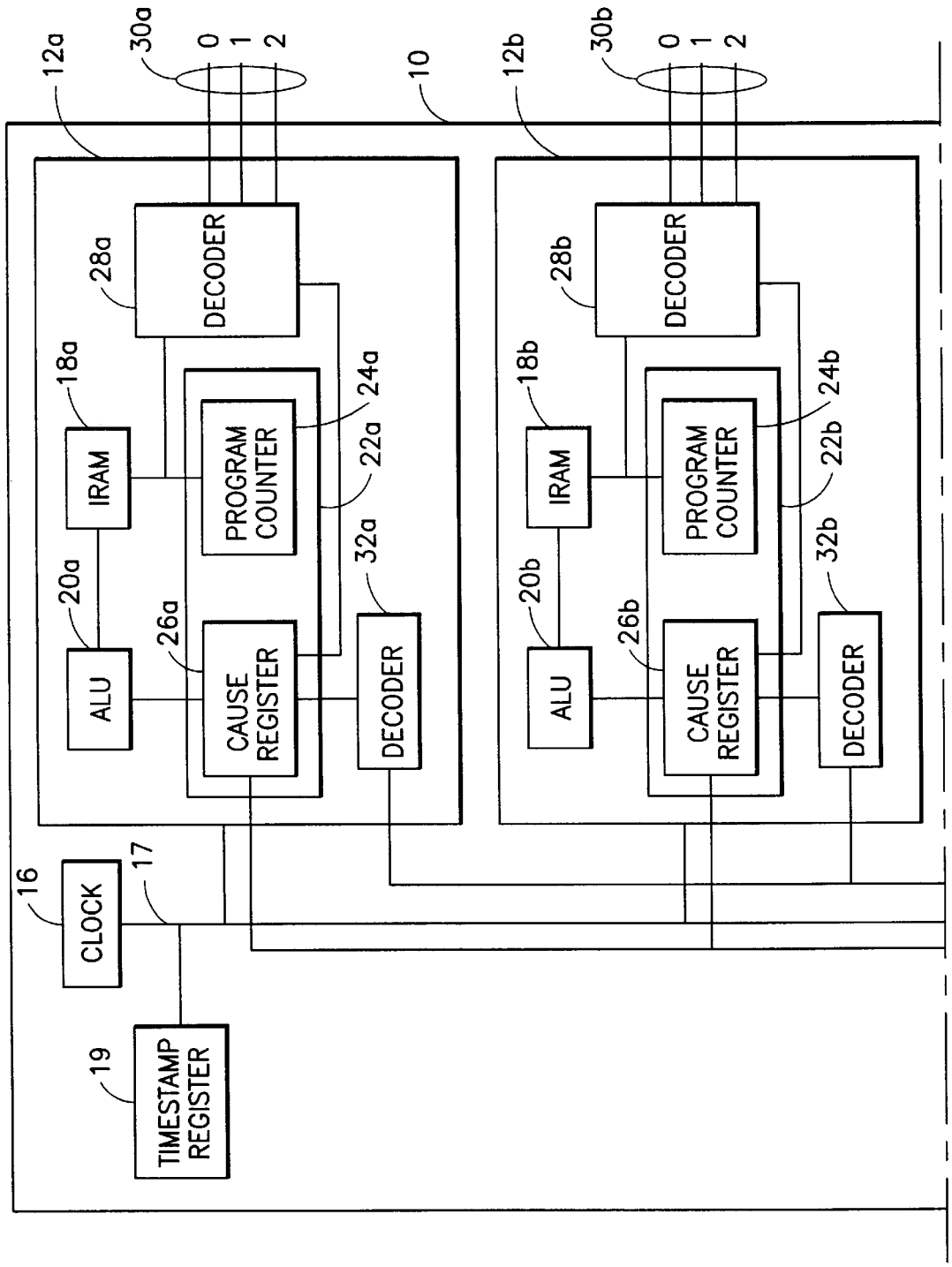

REAL TIME DEBUGGER INTERFACE FOR EMBEDDED SYSTEMS

BACKGROUND OF THE INVENTION

1. Field of the Invention

The invention relates to systems and methods for debugging software in real time. More particularly, the invention relates to systems and methods for the real time debugging of firmware in embedded systems, e.g. ASIC chips having one or more processors on a single chip.

2. State of the Art

Software debugging may be accomplished in a number of ways, some of which are not performed in real time. A traditional debugging technique is to step through program instructions at a rate much slower than the rate at which the program is designed to run in real time. By stepping through the program instructions one-by-one, errors can be observed as they happen and the program code lines executed immediately prior to the error can be analyzed to find the cause of the error. This technique is not helpful, however, if the error in program execution is the result of timing errors or other types of errors which only occur when the program is running at real time speed. As used herein, the term "real time" means the rate at which a program must execute in order to process the incoming data rate which may be quite high.

A widely used technique for debugging a program which is running in real time is called "tracing". Tracing involves recording the transactions performed by the computer as it executes the program code. The trace of activities performed by the computer during the time of a failure can be a useful guide in isolating possible causes of the failure.

Another useful debugging tool is to set breakpoints at selected places in the program. The breakpoints trap the flow of the software and provide insight into whether, when, and how certain portions of the software are entered and exited. An analysis of the flow of the software can provide information which is useful in isolating bugs.

Many state-of-the-art tracing and trapping methods are accomplished by a debug support circuit which is connected to the system bus, i.e. the bus which couples the CPU to memory. See, for example, U.S. Pat. No. 5,491,793 to Somasundaram et al. entitled "Debug Support in a Processor Chip." Connecting a debug circuit to the system bus is convenient because addresses, instructions, and data can be accessed via the system bus. However, coupling the debug support circuit to the system bus increases the electrical load on the bus and interferes with the operation of the bus. Moreover, operation of the system bus may interfere with operation of the debug support circuit. In addition, the system bus may not provide all the information necessary for debugging a program running on a CPU which uses internal cache. These CPUs will not access the system bus if the information they need is available in cache. If an error occurs while the CPU is accessing internal cache, the debug support circuit will not be able to access the information it needs.

Another tracing and trapping method is disclosed in U.S. Pat. No. 5,833,310 to Whistel et al. entitled "On-Chip In-Circuit-Emulator Memory Mapping and Breakpoint Register Modules." According to this method, an internal bus controller is coupled to the memory address bus and a match register. When a memory address written to the address bus matches an address in the match register, a memory mapping module maps a memory cycle to an external debug memory. The user can set specific bus event conditions for which memory is mapped by writing to a set of breakpoint registers. A disadvantage of this method is that it requires an additional set of I/O pins for the chip so that the external debug memory can be coupled to the chip. This may require a significant number of pins since the addresses to be mapped may be 32 or 64 bits wide.

Still another tracing and trapping method is disclosed in U.S. Pat. No. 5,513,346 to Satagopan et al. entitled "Error Condition Detector for Handling Interrupt in Integrated Circuits Having Multiple Processors." According to this method, an interrupt processor controller intercepts all interrupts and routes them to the appropriate processor in a multiprocessor chip. The interrupt processor controller includes logic which determines when an interrupt will cause an error because a previously instigated interrupt has not been cleared. When such an error is detected, a bit is set in an error detect register, the bit corresponding to an interprocessor interrupt channel. The bits in the register are ORed and a single bit output indicates the occurrence of an error. The register may then be examined to determine the location of the interrupt error in the executing code. This method does not interfere with the system bus and does not require very many additional pins on the chip. However, the debugging information that it provides is limited.

The Motorola MPC-860 PowerQuicc™ includes a program development system interface port which provides a three bit output indicative of the state of the program execution as the program is being executed. The MPC-860 is a 40 mHz communications controller but the development system interface port is only operable at a rate of 4 mHz. Thus, the port can not be used for real time debugging. The specifications for the MPC-860 are found in the "MPC-860 POWERQUICC USER'S MANUAL", Copyright 1996 Motorola, Inc., Schaumberg, Ill., the complete disclosure of which is incorporated herein by reference.

ASIC design using one or more embedded processors poses additional debugging challenges. The prior art methods of trapping instructions at a given point in time implies that the system must be stopped to allow debugging of firmware. Once the system is stopped, however, real time events and their timing relationships are lost. If there is a firmware bug which is only identifiable in the presence of live traffic (during real time operations) it is necessary to obtain contextual information about the error before the firmware is changed.

SUMMARY OF THE INVENTION

It is therefore an object of the invention to provide a debugging interface for tracing instructions without loss of real time context and event interaction.

It is also an object of the invention to provide a debugging interface which does not interfere with the operation of a processor or system bus.

It is another object of the invention to provide a debugging interface which does not require many additional pins on a processor chip.

It is a further object of the invention to provide a debugging interface which provides access to a substantial amount of information about the executed instructions.

In accord with these objects which will be discussed in detail below, the debugging interface of the present invention includes a first decoder coupled to the sequencer of a processor and to the Instruction RAM (IRAM) of the processor. The first decoder, according to the invention, provides a real time three bit output on a cycle by cycle basis which is indicative of the processor activity during the last clock cycle. According to a presently preferred embodiment, the three bit output indicates seven different conditions regarding processor activity. In particular, the three bit output indicates whether or not a new instruction has been executed since the last clock cycle, and if a new instruction has been executed, whether the last instruction executed by the processor was an immediate jump, a jump to register, or a branch taken. In addition, the three bit output will indicate whether execution of the instruction resulted in an exception. By recording this three bit output over time, and comparing it to the actual instructions listed in the program code, important debugging information is obtained about a program which was running in real time.

According to a preferred embodiment of the invention, a second decoder and an event history buffer are coupled to the cause register of the sequencer of the processor. In particular, the second decoder is coupled to the enable input of the history buffer and the cause register is coupled to the data input of the history buffer. The second decoder decodes the contents of the cause register and enables the history buffer whenever the contents of the cause register indicates an exception, a jump register instruction, or a change in the status of an interrupt line. Whenever the history buffer is enabled, information from the cause register and the program counter is loaded into the buffer. By recording the contents of the history buffer over time, and comparing the information to the actual program code, additional important debugging information is obtained about a program which was running in real time. According to this preferred embodiment of the invention, the seventh condition indicated by the three bit output of the first decoder is whether an exception was encountered without writing to the history buffer.

According to the presently preferred embodiment, each entry in the event history buffer is forty-four bits. Each forty-four bit entry in the history buffer includes the current sixteen bit time stamp, twenty three bits from certain fields of the cause register or program counter, one bit indicating whether the entry is related to a jump or an exception, two bits identifying the processor number (in a multiprocessor system), one bit identifying whether the history buffer has overflowed, and a time stamp rollover bit. The history buffer preferably has a depth of at least sixteen entries.

An exemplary implementation of the debugging interface is embodied on an ASIC chip having three processors. Each processor is provided with two decoders as described above and a single event history buffer is provided on the chip. Nine pins on the chip are used to provide access to the three bit outputs of each first decoder. Three pins on the chip provide serial access (data, clock, and enable) to the contents of the event history buffer. These twelve pins on the chip allow a diagnostic device to be coupled to the chip during real time operations without interfering with the operation of the chip. The outputs of the first decoders and the contents of the event history buffer can be recorded over time by the diagnostic device to provide a real time record of the processing events occurring in the chip during real time. This real time record taken together with knowledge of the program code being executed provides a true picture of the processors' execution sequence in real time and thereby expedite debugging of code.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1B:
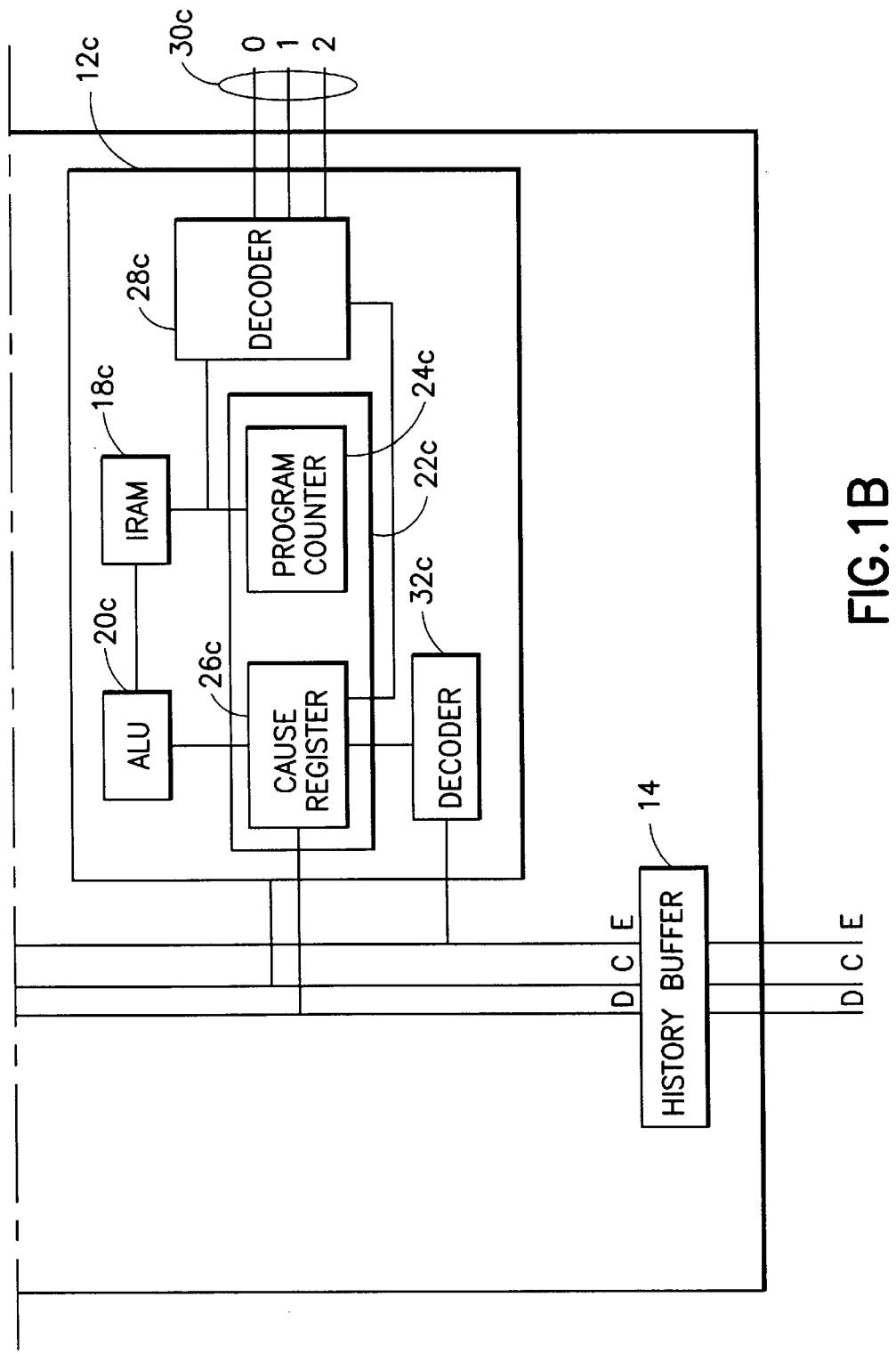
FIG. 1 is a schematic block diagram of an exemplary implementation of a real time debugger interface according to the invention.

Referring now to FIG. 1, an exemplary ASIC chip 10 incorporating a debugger interface according to the invention includes three processors 12a, 12b, 12c, sharing a common clock 16 via a clock bus 17. Each processor includes an instruction RAM (IRAM) 18a, 18b, 18c, an arithmetic logic unit (ALU) 20a, 20b, 20c, and a "sequencer" 22a, 22b, 22c. Each sequencer includes a program counter 24a, 24b, 24c and a cause register 26a, 26b, 26c. Each program counter contains an index of the instructions in an associated IRAM and a pointer to the index as the instructions are executed by the processor. The cause registers store current information about interrupts, exceptions, and other processor functions.

According to one aspect of the invention, a first decoder 28a, 28b, 28c is coupled to each IRAM 18a, 18b, 18c, and to each sequencer 22a, 22b, 22c, i.e., to each program counter and each cause register. Each first decoder has a three bit output 30a, 30b, 30c which is available off the chip 10 via three pins (0, 1, 2) in real time.

As mentioned above, the three bit output of each first decoder 28 provides an indication of the processor activity during the last clock cycle. Thus, the decoder 28 is arranged to indicate whether the program counter has moved its pointer to a new instruction. The decoder also decodes the instruction in the IRAM to provide information about the instruction, and decodes the contents of the cause register to provide an indication of an exception encountered during the execution of an instruction. According to a presently preferred embodiment, the first decoder 28 generates a three bit output which is interpreted as shown in Table 1, below.

TABLE 1

| Output | Mnemonic | Description |
|---|---|---|
| 000 | NC | No Change |
| 001 | INC | Program Counter Increment |
| 010 | JI | Program Counter Jump Immediate |
| 011 | JR | Program Counter Jump Register |
| 100 | ECP | Exception Encountered |
| 101 | PBT | Program Counter Branch Taken |
| 110 | RSD | Reserved |
| 111 | ENH | Exception Encountered, No History Buffer Entry Written |

The output 000 indicates that there has been no change in the processor since the last clock cycle; i.e., the processor has not processed a new instruction and the program counter pointer has not changed. The output 001 indicates that the processor has processed the next instruction in the program; i.e., the program counter pointer has incremented to the next instruction in the index. The output 010 indicates that the last instruction processed by the processor was a "hard coded" jump to an instruction; i.e., the instruction in IRAM pointed to by the program counter includes code indicating that it is a jump instruction to an absolute address in the program. The output 011 indicates that the last instruction processed by the processor was a jump to an instruction based on the contents of a register; i.e., the instruction in IRAM pointed to by the program counter includes code indicating that it is a jump instruction to a location in the program determined by the value of a variable. The output 100 indicates that since the last clock cycle the processor has encountered an interrupt or an exception; i.e., the contents of the cause register contain code which indicates an interrupt or exception. The output 101 indicates that the last instruction processed by the processor was a pc branch taken; i.e., the instruction in IRAM pointed to by the program counter includes code indicating that it is a branch back to another instruction. The output 110 is not presently used, but is reserved for future use. The output 111 indicates that since the last clock cycle the processor has encountered an interrupt or an exception; and that no entry was made in the history buffer The operation of the first decoder 28 and its output is illustrated with reference to a simple code listing which is shown below in Table 2.

TABLE 2

| LINE NUMBER | INSTRUCTION |
| --- | --- |
| 10 | Input A |
| 20 | B = 5 |
| 30 | C = 2 |
| 40 | D = B + C |
| 50 | If D = 7 then Goto 70 |
| 60 | Goto A*10 |
| 70 | B = 4 |
| 80 | Goto 30 |
| 90 | End |

The listing in Table 2 has one "immediate" or "hard coded" jump instruction at line 80 and a conditional branch at line 50. It also has one jump instruction, line 60, based on the contents of a register, i.e. the value of A which is input at line 10. The three bit output of the first decoder during execution of the instructions shown in Table 2 is illustrated in Table 3 below where the values of variables A, B, C, and D are also shown.

TABLE 3

| Current Line | Next Line | A | B | C | D | Mnemonic | Three Bit Output |
| --- | --- | --- | --- | --- | --- | --- | --- |
| 10 | 20 | ? | ? | ? | ? | INC | 001 |
| 20 | 30 | ? | 5 | ? | ? | INC | 001 |
| 30 | 40 | ? | 5 | 2 | ? | INC | 001 |
| 40 | 50 | ? | 5 | 2 | 7 | INC | 001 |
| 50 | 70 | ? | 5 | 2 | 7 | PBT | 101 |
| 70 | 80 | ? | 4 | 2 | 7 | INC | 101 |
| 80 | 30 | ? | 4 | 2 | 7 | JI | 010 |
| 30 | 40 | ? | 4 | 2 | 7 | INC | 001 |
| 40 | 50 | ? | 4 | 2 | 6 | INC | 001 |
| 50 | 60 | ? | 4 | 2 | 6 | INC | 001 |
| 60 | ? | ? | 4 | 2 | 6 | JR | 011 |

When the first instruction (listed in line 10) is executed, the first decoder indicates that a program counter increment (INC) in the execution of the program has occurred and shows an output of "001". As the program progresses from the instruction on line 10 through the instruction on line 40, the first decoder continues to indicate that a program counter increment (INC) in the execution of the program has occurred and continues to show an output of "001". When the instruction on line 50 is executed, the first decoder indicates that a program counter branch taken (PBT) has occurred and shows an output of "101". As seen in Tables 2 and 3, the program branches to line 70 because the conditional expression of line 50 is true based on the variable D=7. Upon execution of line 70, the first decoder indicates that a program counter increment (INC) in the execution of the program has occurred and shows an output of "001".

When the instruction on line 80 is executed, the first decoder indicates that an immediate jump (JI) has occurred and shows an output of "010". As seen in Tables 2 and 3, the program jumps to line 30. When the instructions on lines 30 and 40 are executed, the first decoder indicates that a program counter increment (INC) in the execution of the program has occurred and shows an output of "001". When line 50 is executed (now for the second time) the first decoder indicates that a program counter increment (INC) in the execution of the program has occurred and shows an output of "001" because the condition (D=7) for the jump in line 50 is no longer valid. Line 60 is now executed and a jump to a location stored in a register occurs. The first decoder therefore indicates a jump to register (JR) by showing an output of "011".

Referring once again to FIG. 1, according to another aspect of the invention, each cause register 26a, 26b, 26c is coupled to the data input D of an event history buffer 14 and a second decoder 32a, 32b, 32c is coupled to each cause register and to the enable input E of the history buffer 14. The clock 16 provides the common clock signal to the clock input C of the history buffer 14 via the clock bus 17, and a timestamp register 19 is also coupled to the clock bus 17. The contents of the history buffer 14 are made available off chip by three pins for the data, clock, and enable (D, C, E) of the history buffer 14. According to this aspect of the invention, when certain conditions are detected by one of the second decoders 32, the history buffer is enabled via the appropriate decoder, and information from the cause register, the timestamp register, and the program counter is stored in the history buffer. More particularly, the second decoder 32 enables the history buffer whenever the first decoder contains code which indicates that the processor is processing an instruction to jump to a location stored in a register, whenever the first decoder contains code indicating an exception was encountered, and whenever the first decoder contains code indicating a change in state of an interrupt line.

According to a presently preferred embodiment, when the history buffer is enabled, it captures forty-four bits of information from the cause register or program counter, and the timestamp register. The forty-four bits of information are preferably organized as illustrated in Table 4 below.

TABLE 4

| 43 | 42 | 41 | 40–18 | 17 | 16 | 15–0 |
| --- | --- | --- | --- | --- | --- | --- |
| Mode | | Proc | Cause/PC | HOVRF | TR | Time Stamp |

The first bit, bit location 43, is a mode identifier indicating whether the entry being stored has program counter information or cause register information. A two bit processor identification number is stored in binary form at bit locations 42, 41. This number is used to indicate which processor's information is being stored (in the case of a multiprocessor system). The next twenty-three bits at bit locations 40 through 18 are used to store cause register information or program counter information depending on the mode as explained above. If program counter information is being stored, the contents of the program counter are stored at bit locations 40 through 18. If cause register information is being stored, bit location 40 is used to indicate whether the exception occurred while the processor was executing an instruction in the branch delay slot. (This applies to pipelined processors such as RISC processors.) Bit locations 39 through 35 are used to store processor related exception conditions. Bit locations 34 through 18 are used to store an indication of all pending interrupts (external, software, co-processor. The HOVRF field at bit location 17 is used to indicate whether the internal event history buffer has overflowed. The TR bit 16 is used to indicate a timestamp rollover and bits 15 through 0 are used to store a sixteen bit timestamp. According to the presently preferred embodiment, the forty-four bits captured in the history buffer 14 are serially output on data pin D over forty-four clock cycles (bit serial output).

As mentioned above, the event history buffer records information when an event (either an unmasked exception or a PC jump register instruction) has occurred. According to a presently preferred embodiment, this requires an additional mask register per cause register and a free running timestamp counter. The event masks are provided by a JTAG test register load instruction in the static debug interface. When the cause register bits corresponding to an exception are unmasked or a PC jump register instruction is encountered, an entry is made in the history buffer.

Those skilled in the art will appreciate that the outputs of the first decoder 28 and the contents of the history buffer 14 provide a relatively complete indication of each processor's execution sequence in real time, particularly when viewed in light of the actual program code which is being executed. Therefore, according to the invention, a debugging system may be coupled to the first decoders and history buffer as illustrated in FIG. 2.

Figure 2:
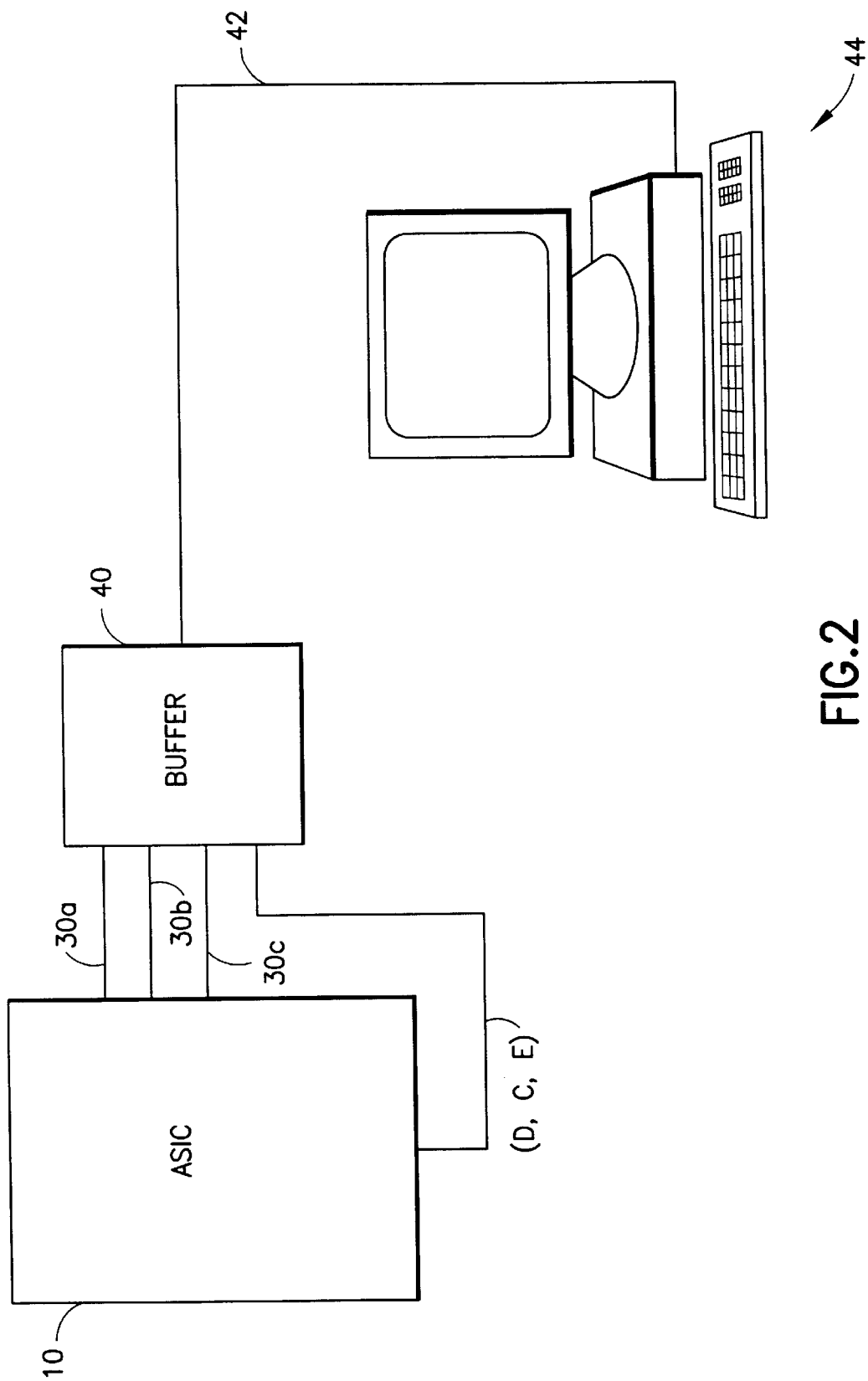
FIG. 2 is a schematic block diagram of a debugging system coupled to a chip embodying a real time debugger interface according to the invention.

Turning now to FIG. 2, the outputs 30a, 30b, 30c of the first decoders and the D,C,E terminals of the history buffer are coupled to a debugging computer 44 which preferably has a copy of the program code stored therein. The three-bit outputs 30a, 30b, 30c of the first decoders and the D,C,E terminals of the history buffer are preferably coupled to an interface buffer 40 which is coupled by a serial, parallel, or network connection 42 to the debugging computer 44. The interface buffer 40 is a rate decoupling buffer. In a present embodiment of the invention, the debugger interface is provided on a 100 MHz three processor system. In that system, the data rate for reading the event history buffer is approximately 1 gigabit/sec. Current PCs cannot keep up with that data rate. Therefore, the buffer 40 is provided to prevent the loss of event history data.

As the program is running on the ASIC 10, the debugging computer 44 collects information from the first decoders and the history buffer. The information collected by the computer 44 is associated with each line of code being executed by the ASIC by stepping through the copy of the code which is stored in the computer 44. When a bug is encountered, the complete history of instruction execution leading up to the failure can be reviewed with the computer 44. The debugging system is non-invasive and permits debugging of programs operating in real time.

There have been described and illustrated herein embodiments of a real time debugger interface for embedded systems. While particular embodiments of the invention have been described, it is not intended that the invention be limited thereto, as it is intended that the invention be as broad in scope as the art will allow and that the specification be read likewise. Thus, while particular encoding schemes have been disclosed with reference to the first decoder output and the history buffer contents, it will be appreciated that other encoding schemes could be utilized provided that they achieve substantially the same results as described herein. Also, while the invention has been illustrated with reference to a three-processor ASIC chip, it will be recognized that the invention may be applied in other types of chips having greater or fewer processors. Moreover, while particular configurations have been disclosed in reference to the indications provided by the first decoders, it will be appreciated that other configurations could be used as well, provided that they achieve substantially the same results as described herein. It will therefore be appreciated by those skilled in the art that yet other modifications could be made to the provided invention without deviating from its spirit and scope as so claimed.

What is claimed is:

1. A processor having a real time debugging interface, said processor comprising:
 a) instruction memory means for storing instructions to be executed by said processor;
 b) program counter means directly coupled to said instruction memory means for indexing said instructions;
 c) cause register means for indicating information regarding interrupts and exceptions; and
 d) first decoder means for indicating information about an instruction executed by said processor during a clock cycle, said first decoder means being directly coupled to said instruction memory means, said program counter means, and said cause register means, said first decoder means having a first output, wherein
 said first output provides information regarding activity of said processor in real time.

2. A processor according to claim 1,
 said information regarding processor activity includes information as to at least one of a jump instruction has been executed, a jump instruction based on the contents of a register has been executed, a branch has been taken, and an exception has been encountered.

3. A processor according to claim 1, wherein:
 said clock cycle is a processor clock cycle, and
 said first decoder means updates said information about each instruction executed by said processor for each said processor clock cycle.

4. A processor according to claim 3, wherein:
 said information about each instruction executed by said processor includes an indication whether or not an instruction has been executed since the previous processor cycle.

5. A processor according to claim 1, wherein:
 said first output consists of a three bit parallel output.

6. A processor according to claim 1, further comprising:
 e) second decoder means directly coupled to said cause register means for indicating information about contents of said cause register means, said second decoder means having a second output; and
 f) event history buffer means for storing information regarding processor events, said event history buffer means having a data input, a data output, and an enable input, said data input being directly coupled to said cause register means and said enable input being directly coupled to said second output, wherein
 said second decoder means decodes contents of said cause register means and enables said event history buffer means to capture contents of said cause register means when contents of said cause register means indicate a particular event.

7. A processor according to claim 6, wherein:
 said second decoder means enables said event history buffer means when contents of said cause register means indicate an event including at least one of a change in status of an interrupt line, an internal processor exception, and a jump instruction based on the contents of a register.

8. A processor according to claim 6, wherein:

said data output of said event history buffer means is a bit serial output.

9. A processor according to claim 6, wherein:

said processor is embodied on a chip having a plurality of pins, said first output and said data output are provided via some of said plurality of pins.

10. A processor according to claim 9, wherein:

said first output is an n-bit parallel output, and said data output is a serial output.

11. An embedded system having a plurality of processors and a real time debugging interface, said system comprising:

a) a plurality of instruction memory means for storing instructions to be executed by a respective one of said plurality of processors;

b) a plurality of program counter means, each directly coupled to a respective one of said plurality of instruction memory means for indexing contents of said instruction memory means;

c) a plurality of cause register means for indicating information regarding interrupts and exceptions for a corresponding one of said plurality of processors, each of said cause register means being directly coupled to a respective one of said processors; and d) a plurality of first decoder means, each said first decoder means directly coupled to a respective one of said instruction memory means, to a respective one of said program counter means, and a respective one of said cause register means, each said first decoder means for indicating information about an instruction executed during a clock cycle by a respective one of said processors, each said first decoder means having a first output, wherein each said first output provides information regarding activity of said processor in real time.

12. An embedded system according to claim 11, wherein:

said information regarding processor activity includes information as to at least one of a jump instruction has been executed, a jump instruction based on the contents of a register has been executed, a branch has been taken, and an exception has been encountered.

13. An embedded system according to claim 11, wherein:

said clock cycle is a processor clock cycle, and each said first decoder means updates said information about each instruction executed by a respective processor for each said processor clock cycle of said respective processor.

14. An embedded system according to claim 13, wherein:

each said information about each instruction executed by a respective processor includes an indication whether or not an instruction has been executed since the previous processor cycle of said respective processor.

15. An embedded system according to claim 11, wherein:

each of said first outputs consists of a three bit parallel output.

16. An embedded system according to claim 11, further comprising:

e) a plurality of second decoder means, each directly coupled to a respective one of said plurality of cause register means, each said second decoder means for indicating information about contents of a respective cause register means; and f) an event history buffer means for storing information regarding processor events, said history buffer means having a data input, a data output, and an enable input, said data input being directly coupled to each of said plurality of cause register means and said enable input being directly coupled to each of said second outputs, wherein each of said second decoder means decodes contents of a respective cause register means and enables said event history buffer to capture contents of said respective cause register means when contents of said respective cause register means indicate a particular event.

17. An embedded system according to claim 16, wherein:

each said second decoder means enables said event history buffer means when contents of a respective cause register means indicate an event including at least one of a change in status of an interrupt line, an internal processor exception, and a jump instruction based on the contents of a register.

18. An embedded system according to claim 16, wherein:

said data output of said event history buffer means is a bit serial output.

19. An embedded system according to claim 11, wherein:

said system is embodied on a chip having a plurality of pins, said first and second outputs are provided via some of said plurality of pins.

20. An embedded system according to claim 19, wherein:

each of said first outputs is an n-bit parallel output, and said second output is a serial output.

21. A processor having a real time debugging interface, said processor comprising:

a) instruction memory means for storing instructions to be executed by said processor;

b) program counter means coupled to said instruction memory means for indexing said instructions;

c) cause register means for indicating information regarding interrupts and exceptions; and d) first decoder means for indicating information about an instruction executed by said processor during a clock cycle, said first decoder means being coupled to said instruction memory means, said program counter means, and said cause register means, said first decoder means having a first output, wherein said first output provides information regarding activity of said processor in real time, said clock cycle is a processor clock cycle, said first decoder means updates said information about each instruction executed by said processor for each said processor clock cycle, and said information about each instruction executed by said processor includes an indication whether or not an instruction has been executed since the previous processor cycle.

22. An embedded system having a plurality of processors and a real time debugging interface, said system comprising:

a) a plurality of instruction memory means for storing instructions to be executed by a respective one of said plurality of processors;

b) a plurality of program counter means, each coupled to a respective one of said plurality of instruction memory means for indexing contents of said instruction memory means;

c) a plurality of cause register means for indicating information regarding interrupts and exceptions for a corresponding one of said plurality of processors, each of said cause register means being coupled to a respective one of said processors; and d) a plurality of first decoder means, each said first decoder means coupled to a respective one of said instruction memory means, to a respective one of said program counter means, and a respective one of said cause register means, each said first decoder means for indicating information about an instruction executed during a clock cycle by a respective one of said processors, each said first decoder means having a first output, wherein each said first output provides information regarding activity of said processor in real time, said clock cycle is a processor clock cycle, each said first decoder means updates said information about each instruction executed by a respective processor for each said processor clock cycle of said respective processor, and each said information about each instruction executed by a respective processor includes an indication whether or not an instruction has been executed since the previous processor cycle of said respective processor.

* * * * *

US006321331C1

(12) EX PARTE REEXAMINATION CERTIFICATE (9126th)

United States Patent
Roy et al.

(10) Number: US 6,321,331 C1
(45) Certificate Issued: Jul. 10, 2012

(54) REAL TIME DEBUGGER INTERFACE FOR EMBEDDED SYSTEMS

(75) Inventors: Subhash C. Roy, Stamford, CT (US); Paul Hembrook, New Milford, CT (US); Eugene L. Parrella, Monroe, CT (US); Richard Mariano, Bethel, CT (US)

(73) Assignee: TR Technologies Foundation LLC, Wilmington, DE (US)

Reexamination Request:
No. 90/011,532, Mar. 4, 2011

Reexamination Certificate for:
Patent No.: 6,321,331
Issued: Nov. 20, 2001
Appl. No.: 09/064,474
Filed: Apr. 22, 1998

(51) Int. Cl.
*G06F 11/36* (2006.01)

(52) U.S. Cl. .............................. 712/244; 714/E11.212; 714/E11.214

(58) Field of Classification Search ........................ None
See application file for complete search history.

(56) References Cited

To view the complete listing of prior art documents cited during the proceeding for Reexamination Control Number 90/011,532, please refer to the USPTO's public Patent Application Information Retrieval (PAIR) system under the Display References tab.

*Primary Examiner* — Woo H Choi

(57) ABSTRACT

A debugging interface includes a pair of decoders and an event history buffer coupled to the sequencer of a processor. The first decoder is coupled to the program counter of the sequencer and the Instruction RAM of the processor. The second decoder is coupled to the cause register of the sequencer and the event history buffer is also coupled to the cause register. The first decoder provides a three bit real time output which is indicative of the processor activity on a cycle by cycle basis. The three bit output indicates seven different conditions: whether the last instruction executed by the processor was an inc, an exception, an exception with no event history buffer entry, or a branch taken, whether there has been no instruction executed since the last clock cycle, and whether a jump was an immediate jump or a jump to a register. The event history buffer is loaded with more detailed information about the instruction last executed when the first decoder indicates that the last instruction was an exception or a jump to a register, and when there is a change in state of an interrupt line or an internal processor exception. An exemplary implementation of the debugging interface is embodied on an ASIC chip having three processors. Each processor is provided with a first and second decoders and a single event history buffer for all processors is provided on the chip.

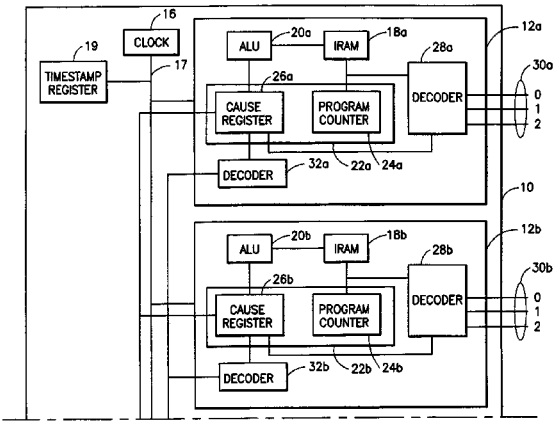

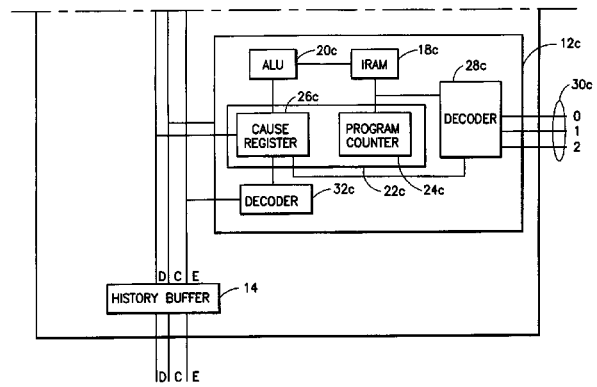

US 6,321,331 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-18 is confirmed.

Claims 19, 21 and 22 are determined to be patentable as amended.

Claim 20 dependent on an amended claim, is determined to be patentable.

New claims 23-38 are added and determined to be patentable.

19. An embedded system according to claim [11] *16*, wherein: said system is embodied on a chip having a plurality of pins, said first and second outputs are provided via some of said plurality of pins.

21. A processor having a real time debugging interface, said processor comprising:
  a) instruction memory means for storing instructions to be executed by said processor;
  b) program counter means coupled to said instruction memory means for indexing said instructions;
  c) cause register means for indicating *cause* information regarding interrupts and exceptions; and
  d) first decoder means for indicating information about an instruction executed by said processor during a clock cycle, said first decoder means being coupled to said instruction memory means, said program counter means, and said cause register means, said first decoder means having a first output, wherein
  said first output provides information regarding activity of said processor in real time, said clock cycle is a processor clock cycle,
  said first decoder means updates said information about each instruction executed by said processor for each processor clock cycle, and
  said information about each instruction executed by said processor includes an indication whether or not an instruction has been executed since the previous processor cycle.

22. An embedded system having a plurality of processors and a real time debugging interface, said system comprising:
  a) a plurality of instruction memory means for storing instructions to be executed by a respective one of said plurality of processors;
  b) a plurality of program counter means, each coupled to a respective one of said plurality of instruction memory means for indexing contents of said instruction memory means;
  c) a plurality of cause register means for indicating *cause* information regarding interrupts and exceptions for a corresponding one of said plurality of processors, each of said cause register being coupled to a respective one of said processors; and
  d) a plurality of first decoder means, each said first decoder means coupled to a respective one of said instruction memory means, to a respective one of said program counter means, and a respective one of said cause register means, each said first decoder means for indicating information about an instruction executed during a clock cycle by a respective one of said processors, each said first decoder means having a first output, wherein
  each said first output provides information regarding activity of said processor in real time,
  said clock cycle is a processor clock cycle,
  each said first decoder means updates said information about each instruction executed by a respective processor for each said processor clock cycle of said respective processor, and
  each said information about each instruction executed by a respective processor includes an indication whether or not an instruction has been executed since the previous processor cycle of said respective processor.

*23. A processor according to claim 1, wherein said information comprises cause information.*

*24. A processor according to claim 1, wherein said information comprises processor related exception conditions and an indication of pending interrupts.*

*25. A processor according to claim 24, wherein said indication of pending interrupts includes at least one of an indication of external, software, or co-processor interrupt.*

*26. A processor according to claim 1, further comprising:*
  *e) event history buffer means for storing information regarding processor events, said event history buffer means having a data input, a data output, and an enable input, said data input being directly coupled to said cause register means.*

*27. A processor according to claim 26, wherein said event history buffer means comprises a plurality of buffers.*

*28. A processor according to claim 26, wherein said event history buffer means is configured to capture contents of said cause register means when enabled by said enable input.*

*29. A processor according to claim 28, wherein said event history buffer is configured to be enabled when the contents of said cause register means indicates a particular event.*

*30. A processor according to claim 29, wherein said particular event is at least one of a change in status of an interrupt line, an internal processor exception, or a jump instruction based on the contents of a register.*

*31. A processor according to claim 1, wherein said cause register means comprises a plurality of registers.*

*32. A processor according to claim 1, wherein said debugging interface is configured to facilitate the correlation of said output of said first decoder means and the information indicated by said cause register means with actual program code being executed by said processor.*

*33. An embedded system according to claim 11, wherein said information comprises cause information.*

*34. An embedded system according to claim 11, wherein said information comprises processor related exception conditions and an indication of pending interrupts.*

*35. An embedded system according to claim 34, wherein said indication of pending interrupts includes at least one of an indication of external, software, of co-processor interrupts.*

36. An embedded system according to claim 11, further comprising:

e) an event history buffer means for storing information regarding processor events, said history buffer means having a data input, a data output, and an enable input, said data input being directly coupled to each of said plurality of cause register means.

37. An embedded system according to claim 36, wherein said event history buffer means comprises a plurality of buffers.

38. An embedded system according to claim 36, wherein said event history buffer means is configured to capture contents of said plurality of cause register means when enabled by said enable input.

* * * * *